US012163839B2

(12) United States Patent
Archibald et al.

(10) Patent No.: US 12,163,839 B2
(45) Date of Patent: Dec. 10, 2024

(54) DETERMINING AN AMBIENT LIGHT UNIT VECTOR AND AN AMBIENT LIGHT INTENSITY VALUE USING A SENSOR BEHIND DISPLAY

(71) Applicant: AMS INTERNATIONAL AG, Jona (CH)

(72) Inventors: James Archibald, Eindhoven (NL); Doug Nelson, Eindhoven (NL); Timothy Cogan, Eindhoven (NL)

(73) Assignee: AMS INTERNATIONAL AG, Jona (CH)

( * ) Notice: Subject to any disclaimer, the term of this patent is extended or adjusted under 35 U.S.C. 154(b) by 296 days.

(21) Appl. No.: 17/617,722

(22) PCT Filed: Jul. 16, 2020

(86) PCT No.: PCT/EP2020/070193
§ 371 (c)(1),
(2) Date: Dec. 9, 2021

(87) PCT Pub. No.: WO2021/018621
PCT Pub. Date: Feb. 4, 2021

(65) Prior Publication Data
US 2022/0236110 A1    Jul. 28, 2022

Related U.S. Application Data

(60) Provisional application No. 62/878,935, filed on Jul. 26, 2019.

(51) Int. Cl.
*G01J 3/50* (2006.01)
*G01J 1/42* (2006.01)
*G09G 3/3208* (2016.01)

(52) U.S. Cl.
CPC ............. *G01J 3/506* (2013.01); *G01J 1/4204* (2013.01); *G09G 3/3208* (2013.01);
(Continued)

(58) Field of Classification Search
CPC .. G01J 1/4204; G01J 3/506; G09G 2360/144; G09G 2360/145; G09G 2360/16;
(Continued)

(56) References Cited

U.S. PATENT DOCUMENTS 8,933,916 B1 *   1/2015   Doar .................... H05B 47/11
                                                       345/207
9,622,326 B1 *   4/2017   Devyver .............. G09G 3/3406
(Continued)

FOREIGN PATENT DOCUMENTS

CN    108 716 950 A    10/2018
EP    3 570 267 A1     11/2019
(Continued)

OTHER PUBLICATIONS

International Search Report and Written Opinion for corresponding PCT Patent Application No. PCT/EP2020/070193 dated Oct. 10, 2020.
(Continued)

*Primary Examiner* — Richard J Hong
(74) *Attorney, Agent, or Firm* — Tarolli, Sundheim, Covell & Tummino LLP (57) ABSTRACT

The present disclosure describes a method and apparatus that can be used to determine various characteristics of ambient light when an ambient light sensor is located behind a display screen. The strategy of the disclosure relies, at least in part, on spectral decomposition of ambient light measurements into components (e.g., red, green, and blue components of an Organic Light Emitting Diode ("OLED") display screen and ambient light). Following the spectral decompo-
(Continued)

sition technique, statistical analysis are performed on the measurement data to remove the OLED light components from the measurement. This technique enables determinations such as ambient lux and correlated color temperature independent of the content displayed on the screen.

20 Claims, 9 Drawing Sheets

(52) U.S. Cl.
CPC . *G09G 2360/144* (2013.01); *G09G 2360/145* (2013.01); *G09G 2360/16* (2013.01)

(58) Field of Classification Search
CPC ...... G09G 3/3208; G09G 5/30; G09G 3/2003; G09G 3/3607; G09G 5/02; G09G 3/3406; H04M 2250/12; H05B 47/11
See application file for complete search history.

(56) References Cited

U.S. PATENT DOCUMENTS

| | | | |
|---|---|---|---|
| 2009/0237423 A1* | 9/2009 | Shih | G09G 3/3406 345/102 |
| 2011/0199350 A1* | 8/2011 | Wilson | G09G 5/02 345/207 |
| 2013/0100097 A1 | 4/2013 | Martin | |
| 2016/0232828 A1* | 8/2016 | Jia | G01J 1/4204 |
| 2016/0370231 A1* | 12/2016 | Agahian | G09G 3/2003 |
| 2017/0092228 A1* | 3/2017 | Cote | G09G 5/30 |
| 2018/0080818 A1 | 3/2018 | Tiwari | |
| 2019/0079236 A1 | 3/2019 | Hung | |
| 2019/0318696 A1* | 10/2019 | Imai | G09G 3/3607 |
| 2020/0118521 A1* | 4/2020 | Facchin | G09G 5/02 |
| 2021/0398471 A1* | 12/2021 | Kidoguchi | G09G 3/2003 |

FOREIGN PATENT DOCUMENTS

| | | |
|---|---|---|
| TW | 201321794 | 6/2013 |
| WO | 2017/058421 A1 | 4/2017 |
| WO | 2020/182708 A1 | 9/2020 |

OTHER PUBLICATIONS

Office Action of Feb. 10, 2022, issued for a corresponding Taiwanese patent application (TW 109125108).

* cited by examiner

800 metric = get_metric(data, v, r)

while |metric| > 0.001: # *i.e. while the metric is not sufficiently close to zero*
    v = v + 0.000001 * sign(metric) * r
    metric = get_metric(data, v, r)

Fig. 8

900 metric = get_metric(data, v, r)

while |metric| > 0.001: # *i.e. while the metric is not sufficiently close to zero*
    if sign(scalar) != sign(metric):
        scalar = scalar / 2 # *Halving the scalar leads to a kind of binary search process* scalar = sign(metric) * |scalar| v = v + scalar * r metric = get_metric(data, v, r)

Fig. 9

DETERMINING AN AMBIENT LIGHT UNIT VECTOR AND AN AMBIENT LIGHT INTENSITY VALUE USING A SENSOR BEHIND DISPLAY

RELATED APPLICATIONS

The present invention is a U.S. National Stage under 35 USC 371 patent application, claiming priority to Serial No. PCT/EP2020/070193, filed on Jul. 16, 2020; which claims priority from U.S. Provisional Patent Application No. 62/878,935 filed Jul. 26, 2019; the entirety of both are incorporated herein by reference.

FIELD OF THE DISCLOSURE

This disclosure relates to ambient light sensors.

BACKGROUND

A recent trend in smartphone industrial design, fueled by consumer demand for higher screen to body ratios, has been to maximize the screen area by reducing the bezel width and decluttering the remaining bezel area by removing apertures for optical sensors and other holes for microphones, speakers and/or fingerprint reading devices. This trend has led to many optical sensors, including ambient light sensors, being placed behind the screen. Although, ambient light sensors are able to perform light measurements while behind the screen, on screen content, in many instances, can greatly distort those measurements. For example, a white display will increase the amount of light hitting the ambient light sensor, causing the sensor to overestimate the ambient lux level.

SUMMARY

The present disclosure describes a method and apparatus that can be used to adjust for the distorted readings caused by the ambient light sensor being located behind the display screen. The strategy of the disclosure relies, at least in part, on spectral decomposition of raw light measurements into independent sources (e.g., red, green, and blue display components of an Organic Light Emitting Diode ("OLED") display screen and ambient light). Following the spectral decomposition technique, statistical analyses of decomposed light measurements are performed to arrive at a more accurate ambient light measurement. This technique enables determinations such as ambient lux and correlated color temperature independent of the content displayed on the screen.

The described techniques may be executed, for example, by an electronic control unit ("ECU") or another hardware device. In some implementations, the hardware device or the ECU may be used in combination with software to execute the actions described herein. The ECU may be coupled to a display screen, a memory, and an ambient light sensor such that the ambient light sensor is located behind the display screen.

In particular, the ECU receives ambient light measurements for a multiple optical channels of the ambient light sensor, the ambient light measurements taken over a time interval. For example, in some implementations, the ambient light sensor may include six optical channels that respond to various light frequencies. Each of the six optical channels may be configured to respond to a specific portion of the visible light spectrum. In some implementations, the optical channels may be configured to respond to light outside of the visible light spectrum (e.g., infrared or ultraviolet light). The ambient light measurements may be taken over a period of time (e.g., two seconds, three seconds, or another suitable period of time).

In some implementations, the ECU is operable to perform the following actions when receiving the ambient light measurements. The ECU receives, at a first time of the time interval, a first set of light measurements for a multitude of optical channels of the ambient light sensor, and stores the first set of light measurements with the first time. For example, the ECU may record voltage or other suitable measurement from the channels of the optical sensor for a specific period of time (e.g., 1 millisecond, 3 milliseconds, or another suitable time period) and store those intensity values with the corresponding time data. The ECU then receives, at a second time of the time interval, a second set of light measurements for the optical channels of the ambient light sensor, and stores the second plurality of light measurements with the second time. In some implementations, the ECU may repeat this process every millisecond or three milliseconds until a large number of measurements has been taken (e.g., one thousand measurements).

In some implementations, the ECU is further operable to generate, based on the ambient light measurements, a multitude of vectors for the times during the time interval, where each vector includes multiple measurement values, each measurement value corresponding to an intensity value recorded by a corresponding optical channel of the ambient light sensor. For example, if the ambient light sensor has six channels, the ECU may record intensity values for the six channels at each time interval (e.g., every millisecond) and generate a vector for each measurement taken, where the vector has six dimensions (i.e., a value for each channel).

Additionally, the ECU is operable to retrieve, from the memory, reference data generated based on prior measurements for the optical channels, where the prior measurements are for the display screen. For example, the control unit may be part of a smartphone device that also includes an ambient light sensor and an Organic Light Emitting Diode ("OLED") display screen. The OLED display screen may have a specific spectral power distribution (e.g., reference data). This reference data may have been measured at a prior point in time (e.g., at the factory, in a store, when first setting up the smartphone, or other suitable time). Specifically, each of the red, green, and blue colors of the RGB spectrum may have specific values (or unit values) associated with the OLED display. The electronic control unit may retrieve those values from memory. Those values may be in the same format as the ambient light measurements. For example, if the ambient light measurements received from the ambient light sensor are formatted for six optical channels, the reference data for the OLED display screen may also be formatted to be used with six optical channels. In some implementations, reference data for specific optical channels may be insignificant in view of the type of display screen being measured. Therefore, reference data may include zero values for one or more optical channels.

In some implementations the ECU retrieves a red component reference unit vector, a green component reference unit vector, and a blue component reference unit vector. Each retrieved reference unit vector may include unit intensity values for each optical channel. For example, if a sensor has six optical channels, each of the red component vector, the green component vector and the blue component vector may have a value for each of the optical channels. However, some of the values may be zero because, for example, a specific optical channel may not respond to the wavelengths of the green component.

The electronic control unit is operable to determine, based on the measurement data and the reference data for measurements during the time interval, a first set of intensity data corresponding to a first color component of an image on the display screen, a second set of intensity data corresponding to a second color component of the image on the display screen, a third set of intensity data corresponding to a third color component of the image on the display screen, and a fourth set of intensity data corresponding to an estimate of intensity of ambient light. For example, the electronic control unit may take the spectral response data collected from each of the optical channels and subtract, from the collected spectral response data, the spectral power distribution data, adjusted for magnitude, for the OLED display screen (e.g., the reference data for each channel). In some implementations, the reference data may be stored as unit data (i.e., without a magnitude). In these and other implementations, the magnitude may be calculated, for example, using a mathematical formula or from the magnitude of the ambient light measurements (i.e., the data collected from the ambient light sensor). In some implementations, the magnitude may be calculated based on the output of the display screen.

In some implementations, the first color component is a red color component of the image on the display screen, the second color component is a green color component of the image on the display screen, and the third color component is a blue color component of the image on the display screen. Thus, the electronic control unit may use the stored unit vectors, adjusted for magnitude, to calculate the intensity data for each of the red color component, the green color component, and the blue color component. The calculations may be made using a mathematical formula (e.g., using linear algebra).

In some implementations, the ECU is operable to determine the first set of intensity data, the second set of intensity data, the third set of intensity data, and the fourth set of intensity data by calculating, red component intensity vectors, green component intensity vectors, blue component intensity vectors, and ambient light component intensity vectors. The ECU may perform the calculations based on the reference data and the ambient light measurement data using a set of equations (e.g., linear algebra equations).

The ECU then determines, using statistical correlation between the first set and the fourth set, a first dataset corresponding to a red color component of ambient light. Various statistical correlation techniques may be used to determine a dataset corresponding to a particular color component of ambient light. One technique involves calculating independence metrics over time of a specific color component (e.g., a red color component).

In some implementations, the ECU is operable to determine, the first dataset corresponding to the red color component of the ambient light by taking the following actions. The ECU calculates, for the first dataset (e.g., red color component), a first set of metrics. Each of the first set of metrics is determined using a red component intensity vector and an ambient light component intensity vector that was received at a same time as the corresponding red component intensity vector. For each metric, in response to determining that the metric is less than zero, the ECU may set a scalar value to a negative number, and in response to determining that the metric is greater than zero, the ECU may set the scalar value to a positive number. In addition, the ECU iteratively adds each scalar times a reference vector to a given light component intensity vector, and determines a red light component intensity vector based on result of iteratively adding each scalar to the given light component intensity vector.

The ECU also determines, using statistical correlation between the second set and the fourth set, a second dataset corresponding to a green color component in the ambient light. The ECU may use a similar process to make the determination. For example, the ECU may calculate, for the second dataset (green color component), a second plurality of metrics. Each of the second plurality of metrics is determined using a green component intensity vector and an ambient light component intensity vector that was received at a same time as the corresponding green component intensity vector. For each metric, in response to determining that the metric is less than zero, the ECU may set a scalar value to a negative number, and in response to determining that the metric is greater than zero, the ECU may set the scalar value to a positive number. The ECU may iteratively add each scalar to a given light component intensity vector, and determine a green light component intensity vector based on result of iteratively adding each scalar to the given light component intensity vector.

The ECU also determines, using statistical correlation between the third set and the fourth set, a third dataset corresponding to a blue color component in the ambient light. The ECU is operable to calculate, for the third dataset, a third plurality of metrics. Each of the third plurality of metrics is determined using a blue component intensity vector and an ambient light component intensity vector that was received at a same time as the corresponding blue component intensity vector. For each metric, in response to determining that the metric is less than zero, the ECU may set a scalar value to a negative number, and in response to determining that the metric is greater than zero, the ECU may set the scalar value to a positive number. The ECU may iteratively add each scalar to a given light component intensity vector, and determine a blue light component intensity vector based on result of iteratively adding each scalar to the given light component intensity vector.

In some implementations, the ECU calculates, based on the first dataset, the second dataset, and the third dataset, an ambient light unit vector and an ambient light intensity value. For example, the ECU may retrieve the red light component intensity vector, the green light component intensity vector, and the blue light component intensity vector, and determine the ambient light unit vector and the ambient light intensity value based on the red light component intensity vector, the green light component intensity vector, and the blue light component intensity vector. The ECU may make the determination by modifying the ambient light intensity vector with data from the red light component intensity vector, the green light component intensity vector, the blue light component intensity vector.

The details of one or more implementations are set forth in the accompanying drawings and the description below. Other features and advantages will be apparent from the description and drawings, and from the claims.

DETAILED DESCRIPTION

Figure 1:
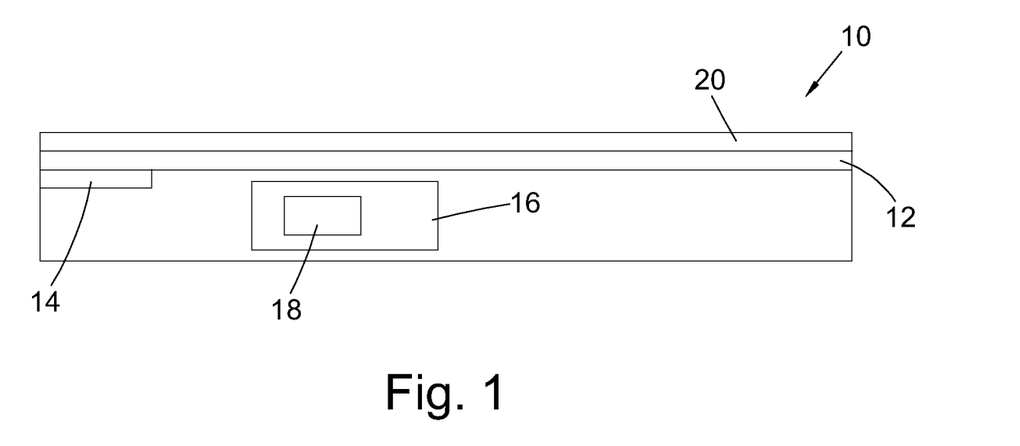
FIG. 1 illustrates an example of a host device (e.g., a smartphone).

As shown in FIG. 1, a host device 10 such as a portable computing device (e.g., a smartphone, personal digital assistant (PDA), laptop or wearable) includes an OLED-type or other display screen 12, which can be disposed directly under a front glass 20. An ambient light sensor (ALS) 14 is disposed directly under a portion of the display screen 12 and is operable to sense ambient light (e.g., sunlight or other background light). The ALS 14 also may sense light generated by the display screen 12 itself. The ALS 14 can comprise one or more photodiodes or other light sensing elements, each of which is sensitive to a respective wavelength, or range of wavelengths, that may differ from one another. An electronic control unit (ECU) 16 is configured to receive, process and analyze signals from the ALS 14 and may control certain functions (e.g., brightness and color) of display screen 12. The ECU 16 can be, for example, a processor for the sensor hub or some other processor in the portable computing device 10. The ECU 16 may also be coupled to memory 18. The memory 18 may be any of random access memory, read-only memory, and other suitable memory.

Figure 2:
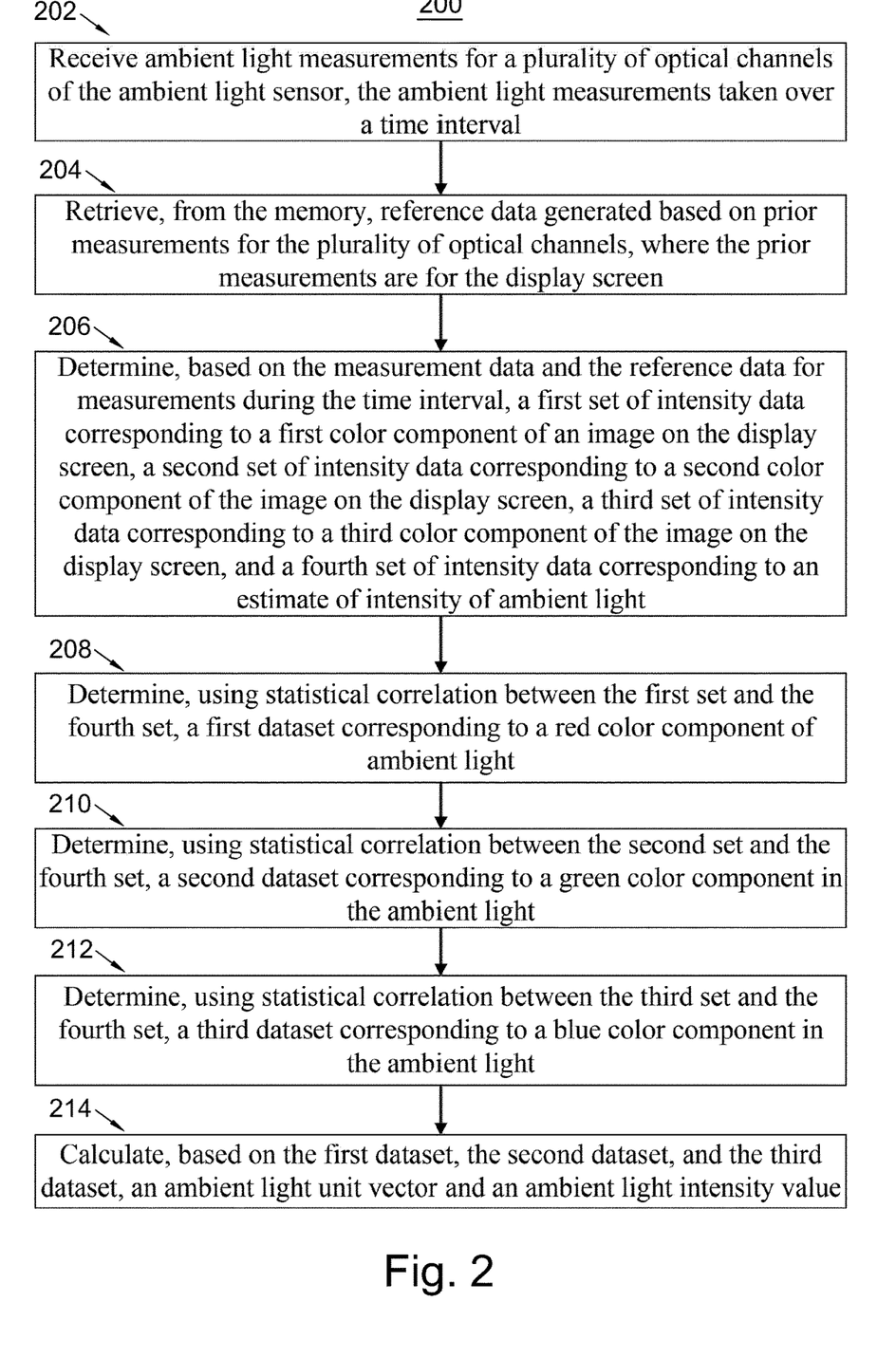
FIG. 2 is a block diagram that illustrates an example of actions for determining an ambient light unit vector and an ambient light intensity value.

The components described above may be used to determine ambient light unit vector and an ambient light intensity value. FIG. 2 is a block diagram that illustrates an example of actions for determining an ambient light unit vector and an ambient light intensity value.

Figure 3:
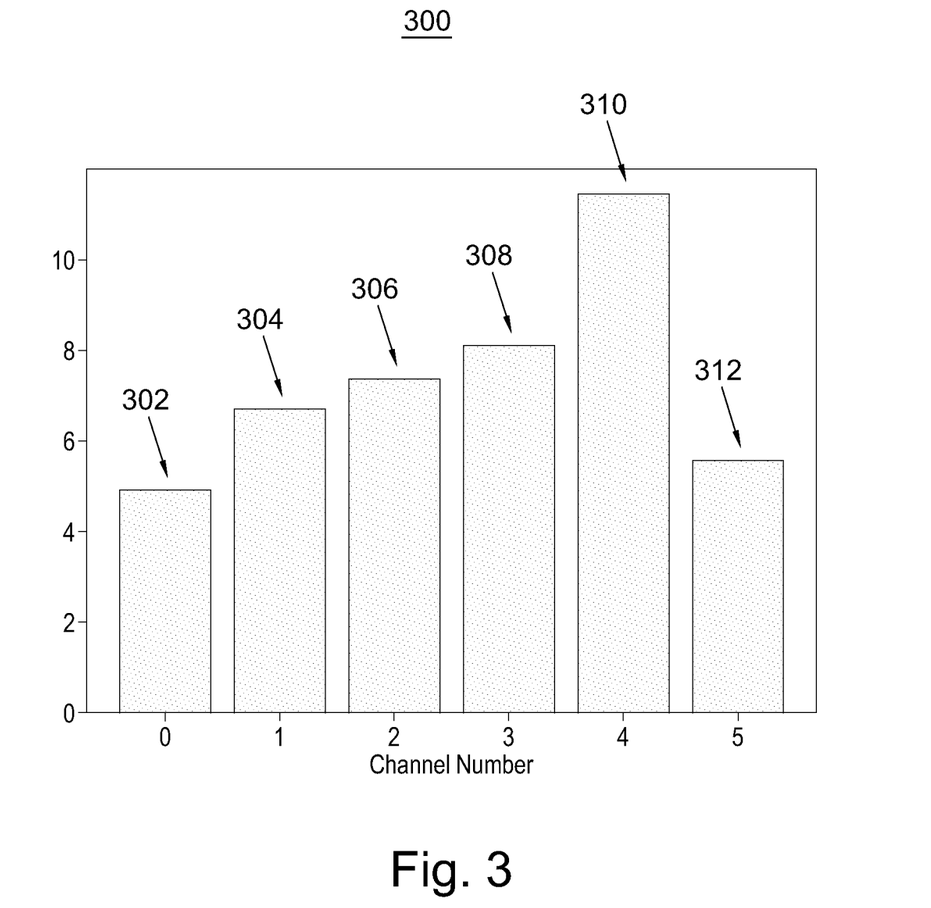
FIG. 3 illustrates output of an ambient light sensor that has six optical channels.
Figure 5:
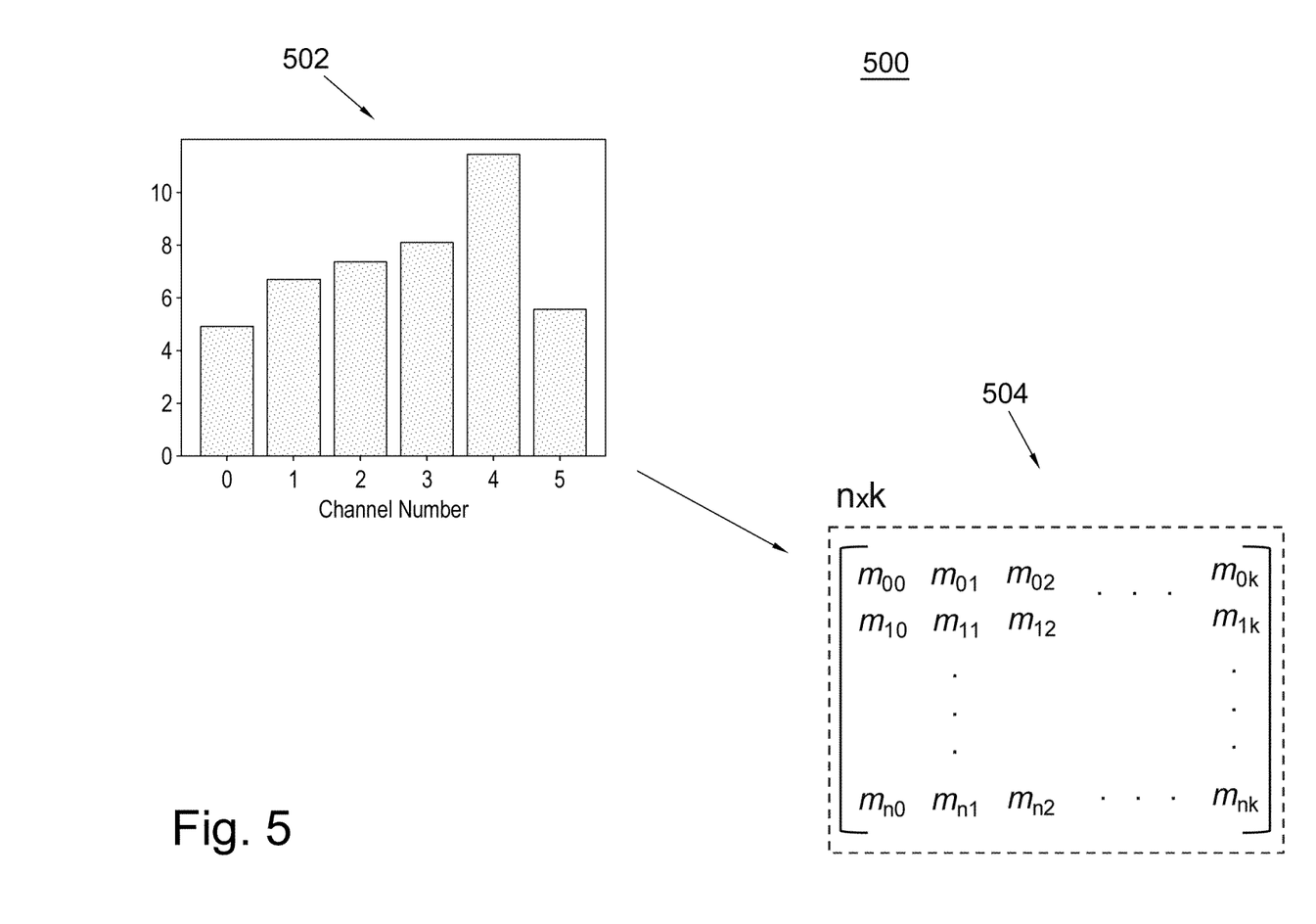
FIG. 5 illustrates possible output values for each of the six optical channels of an ambient light sensor and matching vectors over a time period k.

At 202, the ECU receives ambient light measurements for optical channels (e.g., optical channels 302, 304, 306, 308, 310, and 312) of the ambient light sensor (e.g., ALS 14), the ambient light measurements taken over a time interval. FIG. 3 illustrates output of an ambient light sensor (e.g., ALS 14) that has six optical channels (optical channels 302, 304, 306, 308, 310, and 312). Each channel may include photo-diodes and may respond to a different frequency range. In some implementations, the ECU may make measurements over, for example, a three second interval. The ECU may take a measurement, for example, every millisecond or every three milliseconds. To take a measurement the ECU may record, for example, a voltage value of each channel of the ambient light sensor (e.g. ALS 14). FIG. 5 illustrates possible output values for each of the six optical channels 502 of an ambient light sensor and matching vectors over a time period k. Thus, the ECU may store for each time that the measurement was taken a time within the interval and the vector (i.e., the vector includes measurement data for each channel). The measurement data may be voltages or transformed data to indicate the magnitude of total ambient light acting on each channel. Thus, each vector may include an intensity values for every channel of the ambient light sensor (e.g., ALS 14).

At 204, the ECU retrieves, from memory (e.g., memory 18), reference data generated based on prior measurements for the plurality of optical channels, where the prior measurements are for the display screen (e.g., display screen 12). For example, the reference data may be stored as vectors for each of red color component a blue color component and red color component of the OLED display screen. In some implementations, the reference data may be stored as a unit vector of each color component. The ECU may retrieve the reference data in the form of stored unit vectors.

Figure 4:
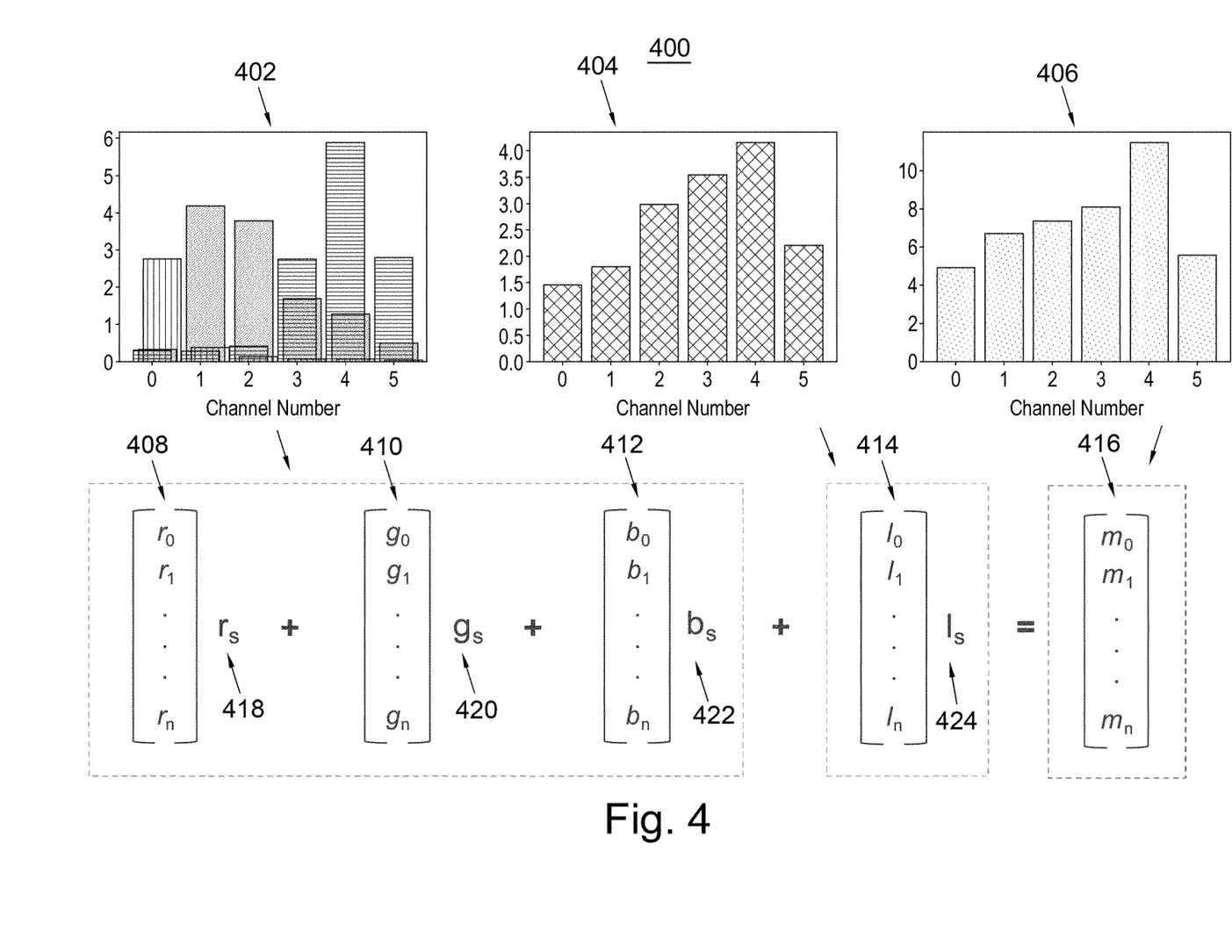
FIG. 4 illustrates decomposition of light into red, green, and blue components of the display screen, and the ambient light component.

At 206, the ECU determines, based on the measurement data and the reference data for measurements during the time interval, a first set of intensity data corresponding to a first color component of an image on the display screen, a second set of intensity data corresponding to a second color component of the image on the display screen, a third set of intensity data corresponding to a third color component of the image on the display screen, and a fourth set of intensity data corresponding to an estimate of intensity of ambient light In some implementations, the first color component is a red color component of the image on the display screen, the second color component is a green color component of the image on the display screen, and the third color component is a blue color component of the image on the display screen. FIG. 4 illustrates decomposition of light into red, green, and blue components of the display screen, and the ambient light component. Graph 402 illustrates intensity values for the red, green, and blue color components within the six optical channels of an ambient light sensor (e.g., ALS 14). Vectors 408, 410, and 412, represent unit vectors for the red, green, and blue components of the display screen (e.g., display screen 12), respectively. Magnitudes 418, 420, and 422 represent magnitudes of the red color component, the green color component, and the blue color component, respectively. Graph 404 represents intensity values of the ambient light component of the measurement for each of the six optical channels. Vector 414 represents a unit vector of the ambient light while magnitude 424 represents the magnitude of the ambient light detected by the ambient light sensor (e.g., ALS 14). Graph 406 represents a total intensity of light that each of the optical channels respond on. That is, graph 406 represents a sum of the ambient light and the light of the display screen (e.g., display screen 12). Vector 416 represents a total intensity value for each of the six optical channels of the ambient light sensor. That is, summing vector 408 multiplied by magnitude 418, vector 410 multiplied by magnitude 420, vector 412 multiplied by magnitude 422, and vector 414 multiplied by magnitude 424 equals to vector 416 (i.e., total intensity detected by each optical channel of the ambient light sensor (e.g., ALS 14).

Using the information of FIG. 4, each of magnitude 418, 420, 422, and 424 may be calculated using a set of equations. That is, vector 416 corresponds to the measurement data collected and each of vector 408, 410, and 412 corresponds to reference data that the ECU retrieves (e.g., At 204). Therefore, the ECU, using a set of equations, may calculate magnitudes 418, 420, 422, and 424, as well as vector 414.

At 208, the ECU determines, using statistical correlation between the first set and the fourth set, a first dataset corresponding to a red color component of ambient light. In some implementations the ECU may use statistic independence of magnitudes of each color component (i.e., red, green, and blue) of the display (e.g., display 12) to generate a dataset of independence values for each color component. For the red color component, the ECU may use magnitudes 418 and 424 for each measurement through the time interval to generate the independence values.

Figure 6:
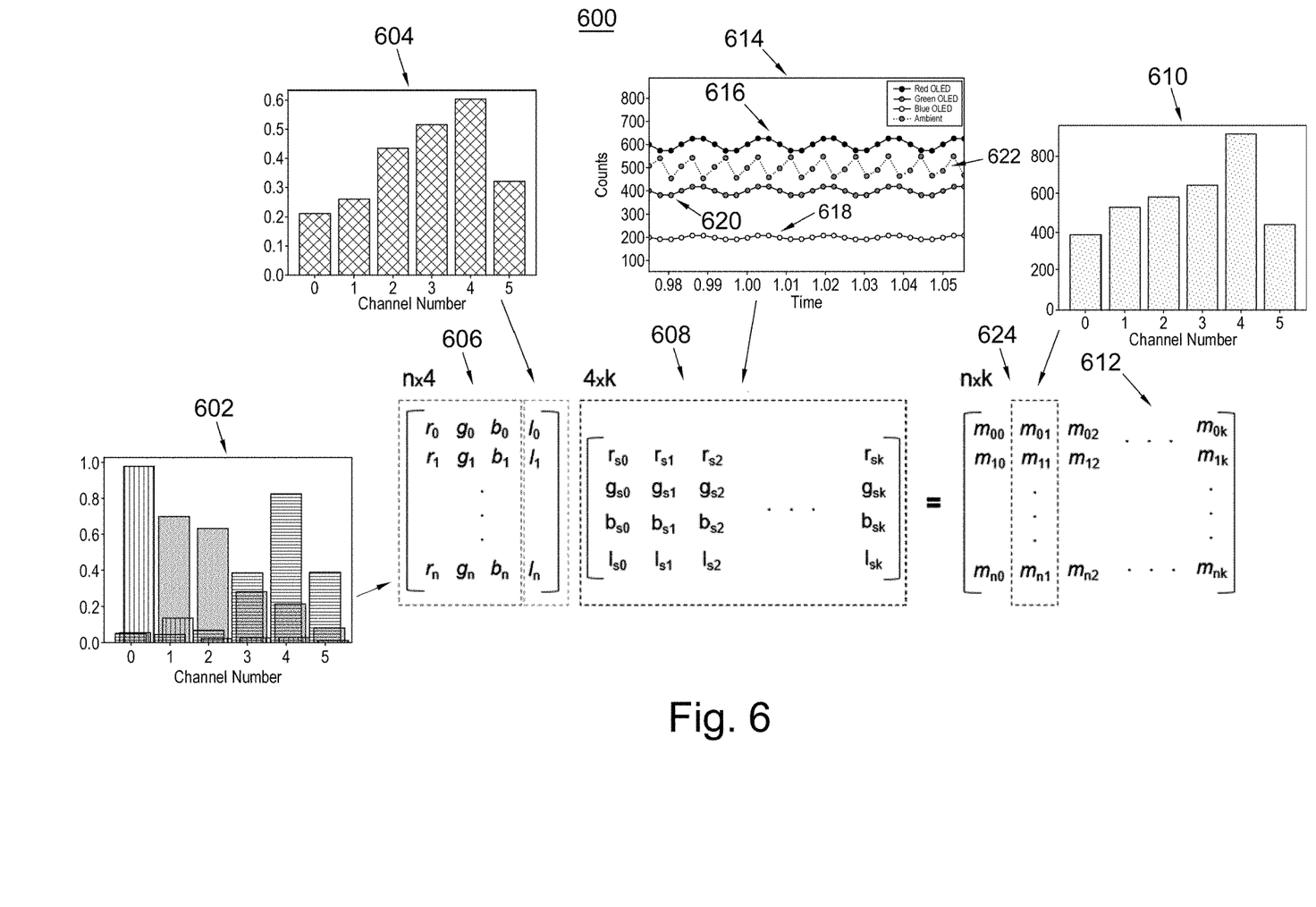
FIG. 6 illustrates how each vector and magnitude may be stored and how the magnitudes may be used to calculate independence values.

FIG. 6 illustrates how each vector and magnitude may be stored and how the magnitudes may be used to calculate independence values. Graphs 602 represents red, green, and blue color components of the display screen as a function of intensity for each optical channel of an ambient light sensor (e.g., ALS 14). Graph 604 represents ambient light component of the intensity of light for each optical channel of the ambient light sensor (e.g., ALS 14). Vectors 606 represent unit vectors for each of red, green, and blue color components of the display screen and a unit vector of ambient light detected by the ambient light sensor. These vectors represent the values for one measurement. For the time period there may be one thousand measurements each having these unit vectors. Vectors 608 represent the intensity values for each of the red, green, and blue color components and the ambient light component over time period k. That is if the time period is three seconds and a measurement was taken every three milliseconds, k will be equal to one thousand and vectors 608 will have one thousand values for each of the components. Graph 610 illustrates the total intensity for each optical sensor for a specific time. For example, graph 610 may illustrate intensities for vector 624 of the set of vectors 612. Vectors 612 correspond to the total intensity magnitude for each of the red, green, and blue color components and ambient light for each measurement taken over the full time interval. Graph 614 represents a graph of intensity values for vectors 608. Curve 616 in graph 614 of FIG. 6 represents intensity counts over time for the red component of a display screen (e.g., OLED screen). Curve 618 in graph 614 of FIG. 6 represents intensity counts over time for the blue component of the display screen (e.g., OLED screen), and curve 620 represents the green component of the display screen (e.g., OLED screen). Curve 622 represents the ambient light component of the measurement. Graph 614 will be discussed in details with respect to FIG. 7

Figure 7:
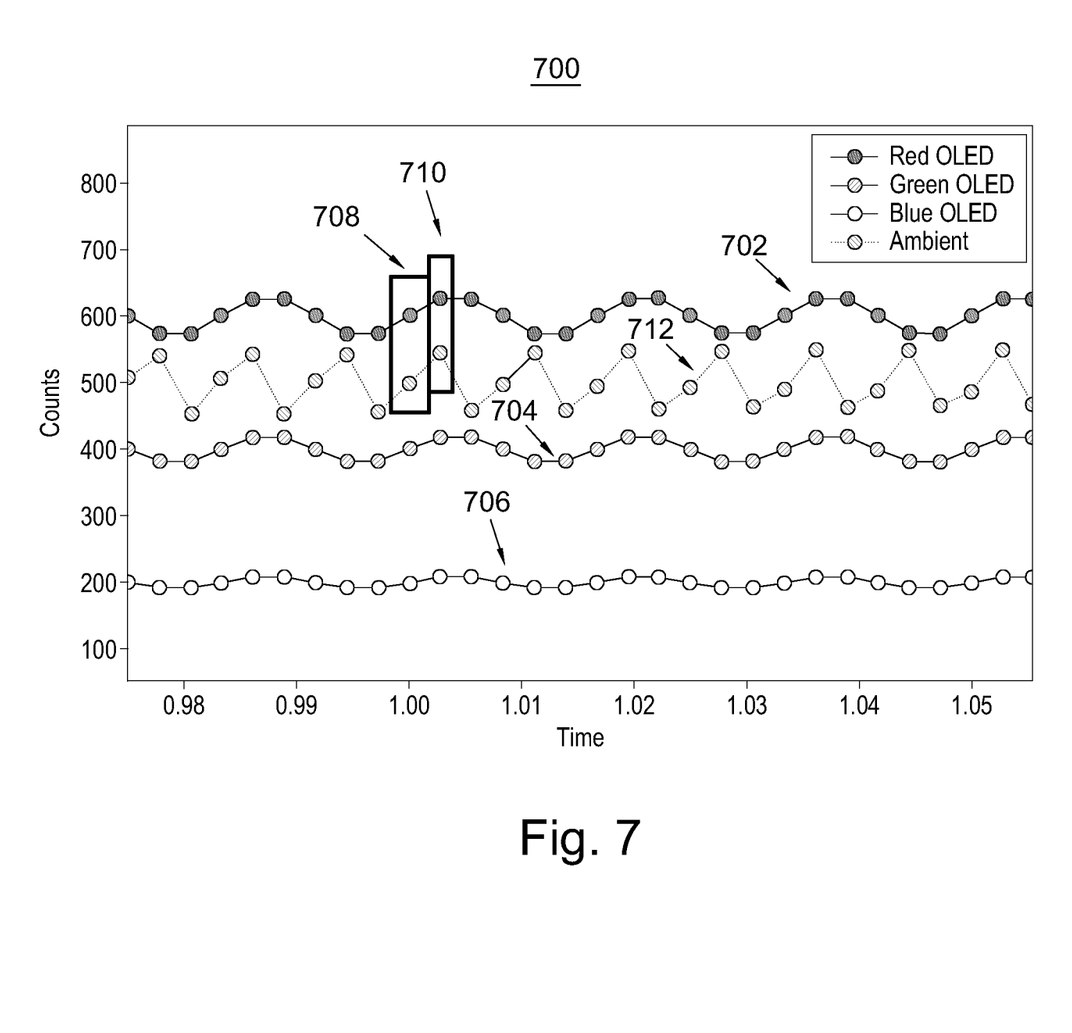
FIG. 7 illustrates a graph of magnitudes over time for each of the red component, green component, and the blue component of the display screen and the magnitude of ambient light.

In some implementations, independence values may be generated by using the magnitude values discussed with respect to FIG. 6. FIG. 7 illustrates a graph of magnitudes over time for each of the red component, green component, and the blue component of the display screen and the magnitude of ambient light. Line 702 represents a graph of red magnitude values over time (e.g., a three second time period). Line 704 represents a graph of green magnitude values over time (e.g., a three second time period) and line 706 represents a graph of blue magnitude values over time (e.g., a three second time period). Line 712 represents the ambient light magnitude over the same time period as the other lines. In order to calculate independence values for the red color component two time adjacent values 708 and 710 are selected from the red color component data (as illustrated with line 702) and from the ambient light component (as illustrated with line 712). Using those two points two vectors are created. A first vector is created for the first time as shown by selection box 708 and a second vector is created for and adjacent time as shown by box 710. The ECU subtracts the first vector from the second vector to obtain a difference vector between the two adjacent time periods. This operation may be performed between every two adjacent time periods for each of the red color component, green color component, and blue color component of the display screen. These operations will create a set of difference values for each color component.

For each of the difference values, the ECU applies an independent metric. The independence metric may, for example, be:

$$\text{metric} = \frac{|v \cdot d_0| - |v \cdot d_1|}{\|v\|}$$

where v is the difference vector as described above, do is the unit vector $$< \frac{1}{\sqrt{2}}, \frac{1}{\sqrt{2}} >$$

and $d_1$ is the unit vector $$< \frac{1}{\sqrt{2}}, -\frac{1}{\sqrt{2}} >.$$

When the metrics nave been calculated (e.g., for the red color component), the ambient light data may be adjusted based on the metrics.

Specifically, for each metric, in response to determining that the metric is less than zero, the ECU sets a scalar value to a negative number, and in response to determining that the metric is greater than zero, the ECU sets the scalar value to a positive number. The ECU iteratively adds each scalar times the vector (e.g., the vector for the red color component, the vector for the green color component, or the vector for the blue color component to a given light component intensity vector (e.g., red color component) and determines a red light component intensity vector based on result.

In some implementations, the ECU may use a Pearson correlation coefficient in the metric calculation. The ECU may use the equation below for the calculation:

$$\text{metric} = \frac{\sum_{k=0}^{n} r'_i l'_i}{\sqrt{\sum_{k=0}^{n} r'^2_i} \sqrt{\sum_{k=0}^{n} l'^2_i}}$$

where $r_i'=r_i-r_{i-1}$ and $l_i'=l_i-l_{i-1}$. In these equations, i refers to a specific time within the time interval and i−1 refers to a previous time within the time interval (e.g., time interval of FIG. 7).

Figure 8:
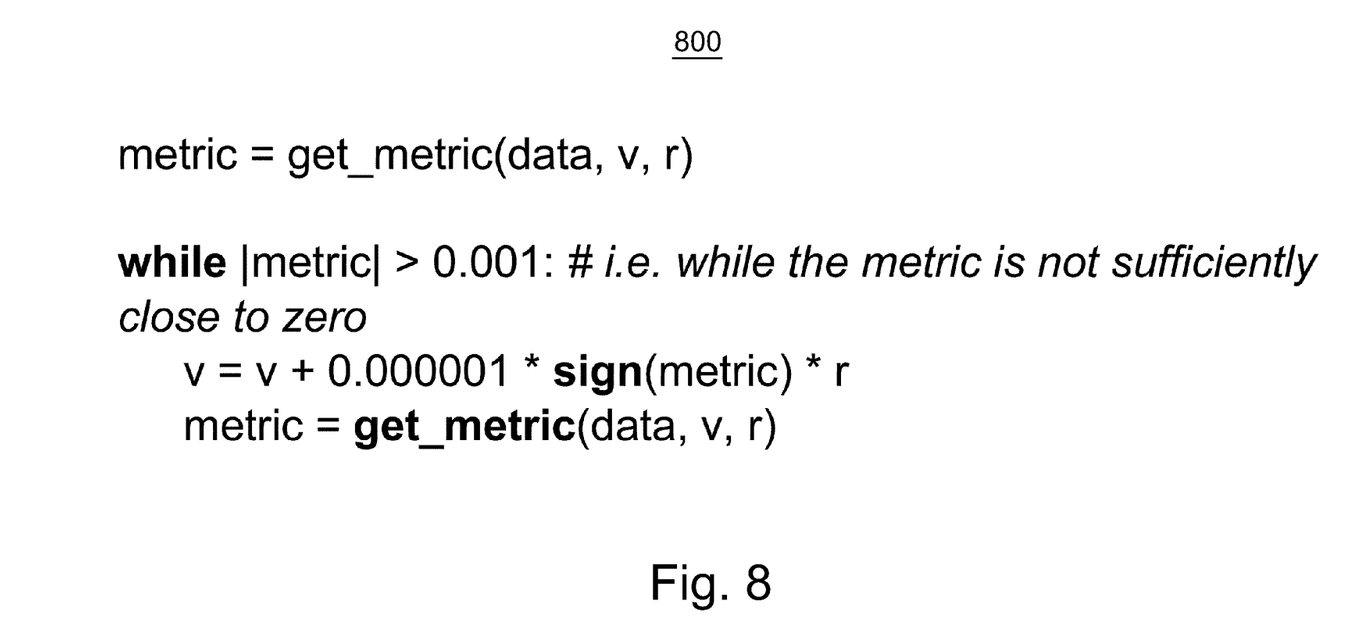
FIG. 8 illustrates using a metric to calculate independence values for each of the red, green, and blue color components.

For example, the algorithm of FIG. 8 may be used in this process where v is the ambient light vector and r is a vector for the red color component. The ECU may use the algorithm of FIG. 8 for the green color component and the blue color component as well. In those instances the r vector would be replaced with the g vector for the green color component and the blue vector for the blue color component respectively. In addition, the ECU uses the data for the green color component (illustrated with line 704) and the data for the blue color component (illustrated with line 706) respectively.

At 210, the ECU determines, using statistical correlation between the second set and the fourth set, a second dataset corresponding to a green color component in the ambient light. The ECU may make the determination for the green color component in the same way as for the red color component, by using the data for the green color component as illustrated by line 704 of FIG. 7. The ECU may also use process 800 of FIG. 8 replacing the r vectors for the red color component with a g vectors for the green color component.

At 212, the ECU determines, using statistical correlation between the third set and the fourth set, a third dataset corresponding to a blue color component in the ambient light. The ECU may make the determination for the blue color component in the same way as for the red color component and the green color component, by using the data for the blue color component as illustrated by line 706 of FIG. 7. The ECU may also use process 800 of FIG. 8 replacing the r vectors for the red color component with a b vectors for the blue color component.

At 214, the ECU calculates, based on the first dataset, the second dataset, and the third dataset, an ambient light unit vector and an ambient light intensity value.

In some implementations, the ECU make the calculations by retrieving the red light component intensity vector, the green light component intensity vector, and the blue light component intensity vector, and determining the ambient light unit vector and the ambient light intensity value based on the red light component intensity vector, the green light component intensity vector, and the blue light component intensity vector. For example, a described in FIG. 8, each value of the ambient light vector may be adjusted using the metric calculation. Also, as illustrated in FIG. 8, the ECU when adjusting the ambient light vector using the metric uses the data for the red color component, the green color component, and the blue color component in their respective calculations. When the ambient light component is adjusted for each of the color component the magnitude and the unit vector are determined where the magnitude is equal to the lux of the ambient light source(s). Based on the vector, the ECU may also determine the color temperature of the ambient light.

As discussed above, FIG. 8 illustrates using a metric to calculate independence values for each of the red, green, and blue color components. The pseudo-code of FIG. 8 may be used to generate a computer program to make the calculations. Specifically, the pseudo code of FIG. 8 illustrates a recursive algorithm that takes as input data, the ambient light vector, and the red color component vector. The algorithm may also take as input green color component vector or blue color component vector. The algorithm then processes the following steps while the absolute value of the variable metric is greater than 0.001. While the absolute value of variable metric is greater than 0.001 a metric is computed $$\left(\text{e.g., using metric} = \frac{|v \cdot d_0| - |v \cdot d_1|}{\|v\|} \text{ equation as discussed above}\right).$$

Based on the calculated metric, the ECU determines the sign of the metric. If the sign of the metric is positive, the ECU sets the sign(metric) parameter of FIG. 8 to a value of one. However, if the sign of the metric parameter is negative, the ECU sets the sign(metric) parameter to a value of negative one. The ECU adds the vector for the ambient light source to a value equals to the scalar variable (e.g., 0.000001) multiplied by the sign(metric) parameter (e.g., one or negative one) and also multiplied by the vector for the red color component when the red color component values are being computed. The ECU then repeats the algorithm (e.g., using recursion). When the absolute value of variable metric is less than or equals to 0.001 the algorithm stops.

Figure 9:
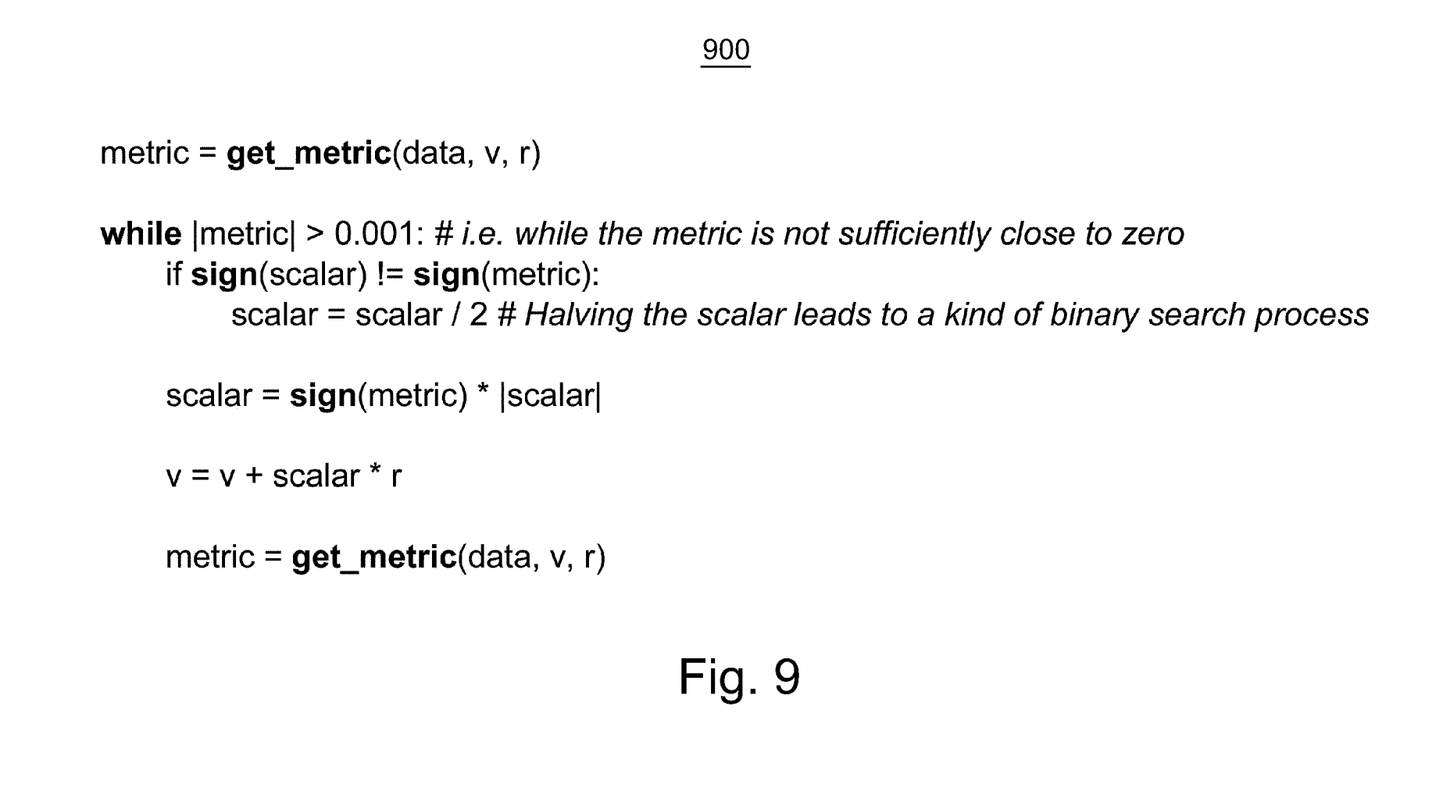
FIG. 9 illustrates another algorithm that may be used to adjust the ambient light vector.

FIG. 9 illustrates another algorithm that may be used to adjust the ambient light vector. The algorithm of FIG. 9 is also a recursive algorithm. While the absolute value of the variable metric is greater than 0.001, the algorithm determines whether the sign of the metric value equals to the sign of the scalar value. If the sign of the scalar and the sign of the metric are not equal then the value of the scalar is divided by two (e.g., a binary search step). The ECU also recalculates the scalar by multiplying the absolute value of the scalar by negative one if the sign of the metric is negative and by one if the sign of the metric is positive. In addition, the ECU calculates the new ambient light vector by adding the value of the recalculated scalar variable multiplied by the red color component vector. The ECU repeats the algorithm (e.g., using recursion) with the newly calculated values. As with the algorithm of FIG. 8, the algorithm of FIG. 9 takes as input various data as well as ambient light vector v and red color component vector r. When performing calculations for the green and blue color components, the ECU executes the metric function with the g vector for the green color component and the b vector for the blue color component, respectively.

The design of smartphones and other host computing devices referenced in this disclosure can include one or more processors, one or more memories (e.g. RAM), storage (e.g., a disk or flash memory), a user interface (which may include, e.g., a keypad, a TFT LCD or OLED display screen, touch or other gesture sensors, a camera or other optical sensor, a compass sensor, a 3D magnetometer, a 3-axis accelerometer, a 3-axis gyroscope, one or more microphones, etc., together with software instructions for providing a graphical user interface), interconnections between these elements (e.g., buses), and an interface for communicating with other devices (which may be wireless, such as GSM, 3G, 4G, CDMA, WiFi, WiMax, Zigbee or Bluetooth, and/or wired, such as through an Ethernet local area network, a T-1 internet connection, etc.).

Various aspects of the subject matter and the functional operations described in this disclosure can be implemented in digital electronic circuitry, or in software, firmware, or hardware, including the structures disclosed in this specification and their structural equivalents, or in combinations of one or more of them. The electronic control unit incorporates digital control circuitry that is configured to perform the actions required to generate an ambient light measurement. In some embodiments, the electronic control unit may incorporate one or more of software, firmware, or other hardware to facilitate the actions of this disclosure. In addition, aspects of the subject matter described in this disclosure can be implemented as one or more computer program products, i.e., one or more modules of computer program instructions encoded on a computer readable medium for execution by, or to control the operation of, data processing apparatus. The computer readable medium can be a machine-readable storage device, a machine-readable storage substrate, a memory device, a composition of matter effecting a machine-readable propagated signal, or a combination of one or more of them. The apparatus can include, in addition to hardware, code that creates an execution environment for the computer program in question, e.g., code that constitutes processor firmware.

A computer program (also known as a program, software, software application, script, or code) can be written in any form of programming language, including compiled or interpreted languages, and it can be deployed in any form, including as a stand-alone program or as a module, component, subroutine, or other unit suitable for use in a computing environment. A computer program does not necessarily correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, sub programs, or portions of code). A computer program can be deployed to be executed on one computer or on multiple computers that are located at one site or distributed across multiple sites and interconnected by a communication.

The processes and logic flows described in this specification can be performed by one or more programmable processors executing one or more computer programs to perform functions by operating on input data and generating output. The processes and logic flows can also be performed by, and apparatus can also be implemented as, special purpose logic circuitry, e.g., an FPGA (field programmable gate array) or an ASIC (application specific integrated circuit).

Processors suitable for the execution of a computer program include, by way of example, both general and special purpose microprocessors, and any one or more processors of any kind of digital computer. Generally, a processor will receive instructions and data from a read only memory or a random access memory or both. The essential elements of a computer are a processor for performing instructions and one or more memory devices for storing instructions and data. Computer readable media suitable for storing computer program instructions and data include all forms of non volatile memory, media and memory devices, including by way of example semiconductor memory devices, e.g., EPROM, EEPROM, and flash memory devices; magnetic disks, e.g., internal hard disks or removable disks; magneto optical disks; and CD ROM and DVD-ROM disks. The processor and the memory can be supplemented by, or incorporated in, special purpose logic circuitry.

While this specification contains many specifics, these should not be construed as limitations on the scope of the invention or of what may be claimed, but rather as descriptions of features specific to particular embodiments of the invention. Certain features that are described in this specification in the context of separate embodiments can also be implemented in combination in a single embodiment. Conversely, various features that are described in the context of a single embodiment can also be implemented in multiple embodiments separately or in any suitable sub-combination. Moreover, although features may be described above as acting in certain combinations and even initially claimed as such, one or more features from a claimed combination can in some cases be excised from the combination, and the claimed combination may be directed to a sub-combination or variation of a sub-combination.

Similarly, while operations are depicted in the drawings in a particular order, this should not be understood as requiring that such operations be performed in the particular order shown or in sequential order, or that all illustrated operations be performed, to achieve desirable results. In certain circumstances, multi-tasking and parallel processing may be advantageous.

A number of embodiments have been described. Nevertheless, it will be understood that various modifications may be made without departing from the spirit and scope of the invention. For example, some of the steps described above may be order independent, and thus can be performed in an order different from that described.

Other implementations are within the scope of the following claims.

The invention claimed is:

1. An apparatus comprising:
a display screen;
a memory;
an ambient light sensor disposed behind the display screen; and
an electronic control unit operable to:
receive ambient light measurements for a plurality of optical channels of the ambient light sensor, the ambient light measurements taken over a time interval;
retrieve, from the memory, reference data generated based on prior measurements for the plurality of optical channels, wherein the prior measurements are for the display screen;
determine, based on the measurement data and the reference data for measurements during the time interval, a first set of intensity data corresponding to a first color component of an image on the display screen, a second set of intensity data corresponding to a second color component of the image on the display screen, a third set of intensity data corresponding to a third color component of the image on the display screen, and a fourth set of intensity data corresponding to an estimate of intensity of ambient light;
determine, using statistical correlation between the first set and the fourth set, a first dataset corresponding to a red color component of ambient light;
determine, using statistical correlation between the second set and the fourth set, a second dataset corresponding to a green color component in the ambient light;
determine, using statistical correlation between the third set and the fourth set, a third dataset corresponding to a blue color component in the ambient light; and
calculate, based on the first dataset, the second dataset, and the third dataset, an ambient light unit vector and an ambient light intensity value.

2. The apparatus of claim 1, wherein the first color component is a red color component of the image on the display screen, the second color component is a green color component of the image on the display screen, and the third color component is a blue color component of the image on the display screen.

3. The apparatus of claim 2, wherein the electronic control unit is operable to receive ambient light measurements from the ambient light sensor over a time period by:
receiving, at a first time of the time interval, a first plurality of light measurements for a plurality of optical channels of the ambient light sensor;
storing the first plurality of light measurements with the first time;
receiving, at a second time of the time interval, a second plurality of light measurements for the plurality of optical channels of the ambient light sensor; and
storing the second plurality of light measurements with the second time.

4. The apparatus of claim 3, wherein the electronic control unit is further operable to generate, based on the ambient light measurements, a plurality of vectors for a plurality of times during the time interval, wherein each vector of the plurality of vectors includes a plurality of measurement values, each measurement value corresponding to an intensity value recorded by a corresponding optical channel of the ambient light sensor.

5. The apparatus of claim 4, wherein the electronic control unit is operable to retrieve, from the memory, reference data generated based on the prior measurements by retrieving a red component reference unit vector, a green component reference unit vector, and a blue component reference unit vector, wherein each retrieved reference unit vector comprises a plurality of unit intensity values for each of the plurality of optical channels.

6. The apparatus of claim 5, wherein the electronic control unit is operable to determine the first set of intensity data, the second set of intensity data, the third set of intensity data, and the fourth set of intensity data by calculating, based on the reference data and the ambient light measurement data using a set of equations, a plurality of red component intensity vectors, a plurality of green component intensity vectors, a plurality of blue component intensity vectors, and a plurality of ambient light component intensity vectors.

7. The apparatus of claim 6, wherein the electronic control unit is operable to determine, the first dataset corresponding to the red color component of the ambient light by: calculating, for the first dataset, a first plurality of metrics, wherein each of the first plurality of metrics is determined using a red component intensity vector and an ambient light component intensity vector that was received at a same time as the corresponding red component intensity vector;
 for each metric:
  in response to determining that the metric is less than zero setting a scalar value to a negative number; and
  in response to determining that the metric is greater than zero setting the scalar value to a positive number;
 iteratively adding each scalar to a given light component intensity vector; and
 determining a red light component intensity vector based on result of iteratively adding each scalar to the given light component intensity vector.

8. The apparatus of claim 7, wherein the electronic control unit is operable to determine, the second dataset corresponding to the green color component of the ambient light by:
 calculating, for the second dataset, a second plurality of metrics, wherein each of the second plurality of metrics is determined using a green component intensity vector and an ambient light component intensity vector that was received at a same time as the corresponding green component intensity vector;
 for each metric:
  in response to determining that the metric is less than zero setting a scalar value to a negative number; and
  in response to determining that the metric is greater than zero setting the scalar value to a positive number;
 iteratively adding each scalar to a given light component intensity vector; and
determining a green light component intensity vector based on result of iteratively adding each scalar to the given light component intensity vector.

9. The apparatus of claim 8, wherein the electronic control unit is operable to determine, the third dataset corresponding to the blue color component of the ambient light by: calculating, for the third dataset, a third plurality of metrics, wherein each of the third plurality of metrics is determined using a blue component intensity vector and an ambient light component intensity vector that was received at a same time as the corresponding blue component intensity vector;
 for each metric:
  in response to determining that the metric is less than zero setting a scalar value to a negative number; and
  in response to determining that the metric is greater than zero setting the scalar value to a positive number;
 iteratively adding each scalar to a given light component intensity vector; and
determining a blue light component intensity vector based on result of iteratively adding each scalar to the given light component intensity vector.

10. The apparatus of claim 9, wherein the electronic control unit is operable to calculate, based on the first dataset, the second dataset, and the third dataset, the ambient light unit vector and the ambient light intensity value by:
 retrieving the red light component intensity vector, the green light component intensity vector, and the blue light component intensity vector; and
 determining the ambient light unit vector and the ambient light intensity value based on the red light component intensity vector, the green light component intensity vector, and the blue light component intensity vector.

11. A method comprising:
 receiving ambient light measurements for a plurality of optical channels of an ambient light sensor, the ambient light measurements taken over a time interval;
 retrieving, from memory, reference data generated based on prior measurements for the plurality of optical channels, wherein the prior measurements are for a display screen;
 determining, based on the measurement data and the reference data for measurements during the time interval, a first set of intensity data corresponding to a first color component of an image on the display screen, a second set of intensity data corresponding to a second color component of the image on the display screen, a third set of intensity data corresponding to a third color component of the image on the display screen, and a fourth set of intensity data corresponding to an estimate of intensity of ambient light;
 determining, using statistical correlation between the first set and the fourth set, a first dataset corresponding to a red color component of ambient light;
 determining, using statistical correlation between the second set and the fourth set, a second dataset corresponding to a green color component in the ambient light;
 determining, using statistical correlation between the third set and the fourth set, a third dataset corresponding to a blue color component in the ambient light; and
 calculating, based on the first dataset, the second dataset, and the third dataset, an ambient light unit vector and an ambient light intensity value.

12. The method of claim 11, wherein the first color component is a red color component of the image on the display screen, the second color component is a green color component of the image on the display screen, and the third color component is a blue color component of the image on the display screen.

13. The method of claim 12, wherein receiving ambient light measurements from the ambient light sensor over a time period comprises:
 receiving, at a first time of the time interval, a first plurality of light measurements for a plurality of optical channels of the ambient light sensor;
 storing the first plurality of light measurements with the first time;
 receiving, at a second time of the time interval, a second plurality of light measurements for the plurality of optical channels of the ambient light sensor; and
 storing the second plurality of light measurements with the second time.

14. The system of claim 13, further comprising generating, based on the ambient light measurements, the plurality of vectors for the plurality of times during the time interval, wherein each vector of the plurality of vectors includes the plurality of measurement values, each measurement value corresponding to an intensity value recorded by a corresponding optical channel of the ambient light sensor.

15. The method of claim 14, wherein retrieving, from memory, reference data generated based on the prior measurements comprises retrieving a red component reference unit vector, a green component reference unit vector, and a blue component reference unit vector, wherein each retrieved reference unit vector comprises a plurality of unit intensity values for each of the plurality of optical channels.

16. The method of claim 15, wherein determining the first set of intensity data, the second set of intensity data, the third set of intensity data, and the fourth set of intensity data comprises calculating, based on the reference data and the ambient light measurement data using a set of equations, a plurality of red component intensity vectors, a plurality of green component intensity vectors, a plurality of blue component intensity vectors, and a plurality of ambient light component intensity vectors.

17. The method of claim 16, wherein determining, the first dataset corresponding to the red color component of the ambient light comprises:
calculating, for the first dataset, a first plurality of metrics, wherein each of the first plurality of metrics is determined using a red component intensity vector and an ambient light component intensity vector that was received at a same time as the corresponding red component intensity vector;
for each metric:
in response to determining that the metric is less than zero setting a scalar value to a negative number; and
in response to determining that the metric is greater than zero setting the scalar value to a positive number;
iteratively adding each scalar to a given light component intensity vector; and
determining a red light component intensity vector based on result of iteratively adding each scalar to the given light component intensity vector.

18. The method of claim 17, wherein determining, the second dataset corresponding to the green color component of the ambient light comprises:
calculating, for the second dataset, a second plurality of metrics, wherein each of the second plurality of metrics is determined using a green component intensity vector and an ambient light component intensity vector that was received at a same time as the corresponding green component intensity vector;
for each metric:
in response to determining that the metric is less than zero setting a scalar value to a negative number; and
in response to determining that the metric is greater than zero setting the scalar value to a positive number;
iteratively adding each scalar to a given light component intensity vector; and
determining a green light component intensity vector based on result of iteratively adding each scalar to the given light component intensity vector.

19. The method of claim 18, wherein determining, the third dataset corresponding to the blue color component of the ambient light comprises:
calculating, for the third dataset, a third plurality of metrics, wherein each of the third plurality of metrics is determined using a blue component intensity vector and an ambient light component intensity vector that was received at a same time as the corresponding blue component intensity vector;
for each metric:
in response to determining that the metric is less than zero setting a scalar value to a negative number; and
in response to determining that the metric is greater than zero setting the scalar value to a positive number;
iteratively adding each scalar to a given light component intensity vector; and
determining a blue light component intensity vector based on result of iteratively adding each scalar to the given light component intensity vector.

20. The method of claim 19, wherein calculating, based on the first dataset, the second dataset, and the third dataset, the ambient light unit vector and the ambient light intensity value comprises:
retrieving the red light component intensity vector, the green light component intensity vector, and the blue light component intensity vector; and
determining the ambient light unit vector and the ambient light intensity value based on the red light component intensity vector, the green light component intensity vector, and the blue light component intensity vector.

* * * * *